United States Patent
Zimmer et al.

(10) Patent No.: US 7,107,441 B2
(45) Date of Patent: Sep. 12, 2006

(54) PRE-BOOT INTERPRETED NAMESPACE PARSING FOR FLEXIBLE HETEROGENEOUS CONFIGURATION AND CODE CONSOLIDATION

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 501 days.

(21) Appl. No.: 10/443,220

(22) Filed: May 21, 2003

(65) Prior Publication Data
US 2004/0236934 A1 Nov. 25, 2004

(51) Int. Cl.
*G06F 13/14* (2006.01)
(52) U.S. Cl. ............................................. 713/1; 713/2
(58) Field of Classification Search ............ 713/1, 713/2
See application file for complete search history.

(56) References Cited

U.S. PATENT DOCUMENTS

| | | | | |
|---|---|---|---|---|
| 5,822,565 | A * | 10/1998 | DeRosa et al. | 703/24 |
| 6,499,102 | B1 * | 12/2002 | Ewertz | 713/1 |
| 6,732,280 | B1 * | 5/2004 | Cheok et al. | 713/300 |
| 6,904,493 | B1 * | 6/2005 | Chiao et al. | 711/103 |
| 2003/0135534 | A1 * | 7/2003 | Natawadi et al. | 709/100 |
| 2003/0204714 | A1 * | 10/2003 | Rothman et al. | 713/100 |
| 2003/0236971 | A1 * | 12/2003 | Rothman et al. | 713/1 |
| 2004/0073818 | A1 * | 4/2004 | Cheok et al. | 713/300 |
| 2004/0103331 | A1 * | 5/2004 | Cooper | 713/323 |
| 2004/0193701 | A1 * | 9/2004 | Michaelis et al. | 709/220 |
| 2004/0193738 | A1 * | 9/2004 | Natu et al. | 710/1 |
| 2005/0149713 | A1 * | 7/2005 | Rothman et al. | 713/1 |
| 2005/0193371 | A1 * | 9/2005 | Fausak | 717/116 |

OTHER PUBLICATIONS http://www.techweb.com/encyclopedia, "interpreter", TechEncyclopedia, (Mar. 19, 2003).
http://searchwebservices.techtarget.com, "namespace", searchWebServices.com Definitions, (Mar. 19, 2003).
http://searchwebservices.techtarget.com, "SAX", searchWebServices.com Definitions, (Mar. 19, 2003).
http://searchwin2000.techtarget.com, "application program interface", searchwin200.com Definitions, (Mar. 17, 2003).
http://www.techweb.com/encyclopedia, "API", TechEncyclopedia, (Mar. 17, 2003).
"Winn L. Rosch Hardware Bible, Sixth Edition", Que Publishing, Intl. Std. Bk. No. 0-7897-2859-1, U.S.A., (Mar. 2003), Ch. 7, p. 203.
Kolinski, J., et al., "Building the Power-Efficient PC—A Developer's Guide to ACPI Power Management", Rich Bowles, U.S.A., (2001), Ch. 3, p. 28; Ch. 7, pp. 91, 97.

* cited by examiner

Primary Examiner—A. Elamin
(74) Attorney, Agent, or Firm—Blakely, Sokoloff, Taylor & Zafman LLP

(57) ABSTRACT

A system and method to interact with a hardware device of a processing system. An interpreted language code defining how to interact with the hardware device of the processing system is provided. The interpreted language code is interpreted to interact with the hardware device of the processing system prior to entering an operating system runtime mode of operation of the processing system.

26 Claims, 6 Drawing Sheets

PRE-BOOT INTERPRETED NAMESPACE PARSING FOR FLEXIBLE HETEROGENEOUS CONFIGURATION AND CODE CONSOLIDATION

TECHNICAL FIELD

This disclosure relates generally to using an interpreted language code to interact with hardware devices of a processing system during a pre-boot runtime, and in particular but not exclusively, relates to sharing advance configuration and power interface machine language control methods across a pre-boot runtime and an operating system runtime of a processing system.

BACKGROUND INFORMATION

Modern computers are complex computing systems, evolving at an ever-increasing rate. With rapid evolution of technologies, original equipment manufacturer ("OEM") system builders are presented with the difficult task of providing seamless integration between cutting edge technologies and legacy technologies. As a result, these OEM system builders often resort to ad hoc methods to integrate the new with the old. These ad hoc methods, while often providing a sufficient solution, often fail to fully leverage the advantages of these new technologies.

One such new technology is the Advance Configuration and Power Interface ("ACPI"), defined in the ACPI Specification, Revision 2.0a, Mar. 31, 2002 developed in cooperation by Compaq Computer Corp., Intel Corp., Microsoft Corp., Phoenix Technologies Ltd., and Toshiba Corp. The ACPI Specification was developed to establish industry common interfaces enabling robust operating system ("OS") directed motherboard device configuration and power management of both devices and entire systems. ACPI evolves an existing collection of power management BIOS code, Advance Power Management ("APM") application programming interfaces ("APIs"), and the like into a well-defined power management and configuration interface specification. ACPI provides a way for an orderly transition from existing legacy hardware to ACPI hardware, and allows for both ACPI and legacy mechanisms to simultaneously exist within a single processing system.

The ACPI specification further describes a programming language, called ACPI Source Language ("ASL"), in which hardware designers can write device interfaces, called control methods. ASL is compiled into ACPI machine language ("AML") and the AML control methods placed in ACPI tables within system memory for use by the OS to interact with hardware devices.

The basic input output system ("BIOS") sets up the ACPI tables during the boot process (i.e., pre-boot runtime); however, the BIOS itself does not use the AML control methods to interact with the hardware devices of the processing system. Instead, the BIOS relies on BIOS APIs, generally stored in nonvolatile flash memory, to perform the very same interactions with hardware devices as are described by the AML control methods. These BIOS APIs are usually coded in C and compiled into machine language binaries for use by the BIOS.

Thus, OEM system builders must include two independent sets of coded device interfaces—APIs for use by the BIOS and AML control methods for use by the OS—to perform the same tasks. This ad hoc integration of the new ACPI technology with the old BIOS API legacy is wasteful both in terms of limited nonvolatile flash memory and OEM system builder time. Furthermore, this ad hoc integration fails to fully leverage the advantages of ACPI.

For example, AML is a declarative language which describes how a particular interaction with a hardware device may be accomplished and allows the entity calling the AML control method to decide whether or not it wishes to execute the particular tasks described. AML increases system reliability by bounding and guarding the operation of low-level management code. In other words, AML is transparent as to its internal or physical level operations. In contrast, BIOS APIs are defined by an imperative machine language called binaries. An entity calling a binary has no idea how or what the binary executes to accomplish the requested hardware task. Because BIOS APIs are manipulating hardware registers to control hardware devices, the computing system is particularly vulnerable to errant writes and other failures. Prior experience with BIOS APIs shows that they are a rich source of problems. Thus, API binaries do not provide the level of supervision and transparency of operation, as provided by AML control methods.

Another deficiency with API binaries is their lack of portability between software platforms. API binaries are compiled to execute within a particular platform environment. Where as AML control methods abstract the physical implementation through use of an OS interpreter. The OS interpreter interprets the AML control methods on the fly thereby accommodating various software platforms. The OS interpreter (a single entity) may need to be platform specific, but the multitudes of AML control methods are platform independent.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for using an interpreted language code to interact with hardware devices of a processing system during a pre-boot runtime are described herein. Although embodiments of the present invention may be extended for use with various types of interpreted languages, the present invention will primarily be described in connection with ACPI machine language ("AML"). In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. An "interpreted language code" is any program code that is translated and executed at the same time. A translator application translates one program statement of the interpreted language code into machine language, executes the machine language, and then proceeds to the next program statement. In contrast, imperative language code (e.g., a regular executable program) is presented to a computer as a binary-coded instruction. AML is an example of an interpreted language code. AML is an interpreted assembly-level machine language in which low-level sequences can be written. These sequences are interpreted and executed by an AML interpreter so they can be robustly checked and validated at each step of the sequence.

Figure 1:
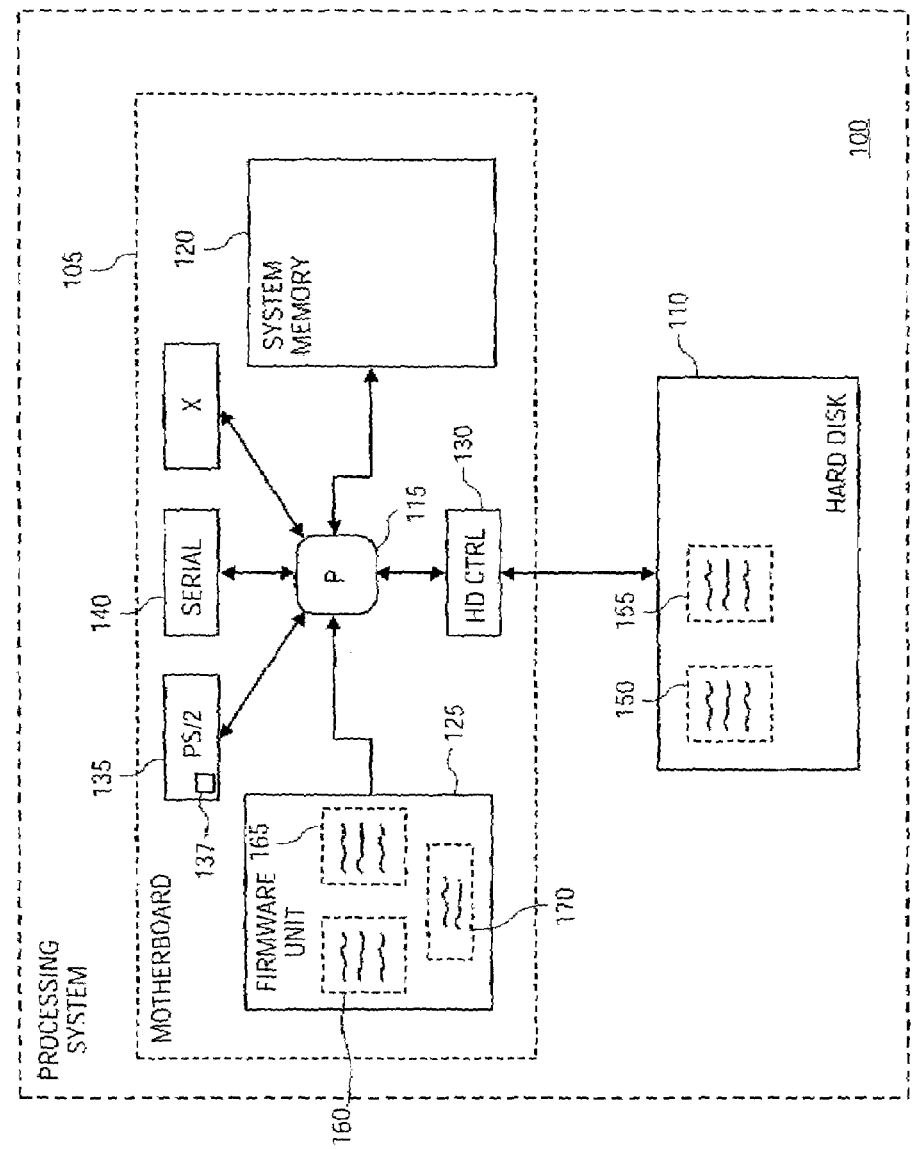
FIG. 1 is a block diagram illustrating a processing system to execute interpreted language code to interact with hardware devices of the processing system during a pre-boot runtime, in accordance with an embodiment of the present invention.

FIG. 1 is a block diagram illustrating one embodiment of a processing system 100 to execute an interpreted language code to interact with hardware devices of processing system 100 during a pre-boot runtime of processing system 100, in accordance with the teachings of the present invention. In one embodiment, processing system 100 includes a motherboard 105 and a hard disk 110. In the illustrated embodiment, motherboard 105 includes a processor 115, system memory 120, a firmware unit 125, a hard disk controller 130, a PS/2 keyboard controller 135 having an option ROM 137, a serial port 140, and various other motherboard components represented by a component "X".

The elements of one embodiment of processing system 100 are interconnected as follows. System memory 120 and firmware unit 125 are communicatively coupled to processor 115 allowing processor 115 to execute software instructions received therefrom. Processor 115 is further communicatively coupled to each of hard disk controller 130, PS/2 keyboard controller 135, serial port 140, and component X to receive data therefrom and to send data thereto. Hard disk controller 130 further couples processor 115 to hard disk 110. Optionally, software files stored on hard disk 110, such as OS files 150 and an OS interpreter 155 may be transferred via hard disk controller 130 into system memory 120 and may be executed from there by processor 115. Similarly, firmware instructions, such as interpreted language code 160, a pre-boot interpreter 165, and a setup display engine 170 may optionally be loaded from firmware unit 125 into system memory 120 and executed by processor 115 therefrom. It should be appreciated that various other elements of processing system 100, some optional and some necessary, have been excluded from FIG. 1 and this discussion for the purposes of clarity.

In one embodiment, hard disk 110 is an EIDE hard disk. In other embodiments, hard disk 110 may include an IDE hard disk, a SCSI hard disk, a tape drive, a CD-ROM drive, a ZIP drive or other similar nonvolatile storage devices. It should be appreciated that various other known or future arising implementations of storing data may replace hard disk 110 for storing OS files 150 and OS interpreter 115 within the scope of the present invention. Furthermore, OS files 150 and OS interpreter 155 may be stored over a number of storage devices, such as with a redundant array of independent disks ("RAID"). In one embodiment, system memory 120 is system random access memory. It should be appreciated that other known or after arising technology for storing applications executed by a processor may implement the functionality of system memory 120, within the scope of the present invention. In one embodiment, firmware unit 125 is flash memory. In other embodiments, firmware unit 125 may include read only memory ("ROM"), programmable ROM, erasable programmable ROM, electrically erasable programmable ROM, or the like.

Figure 2:
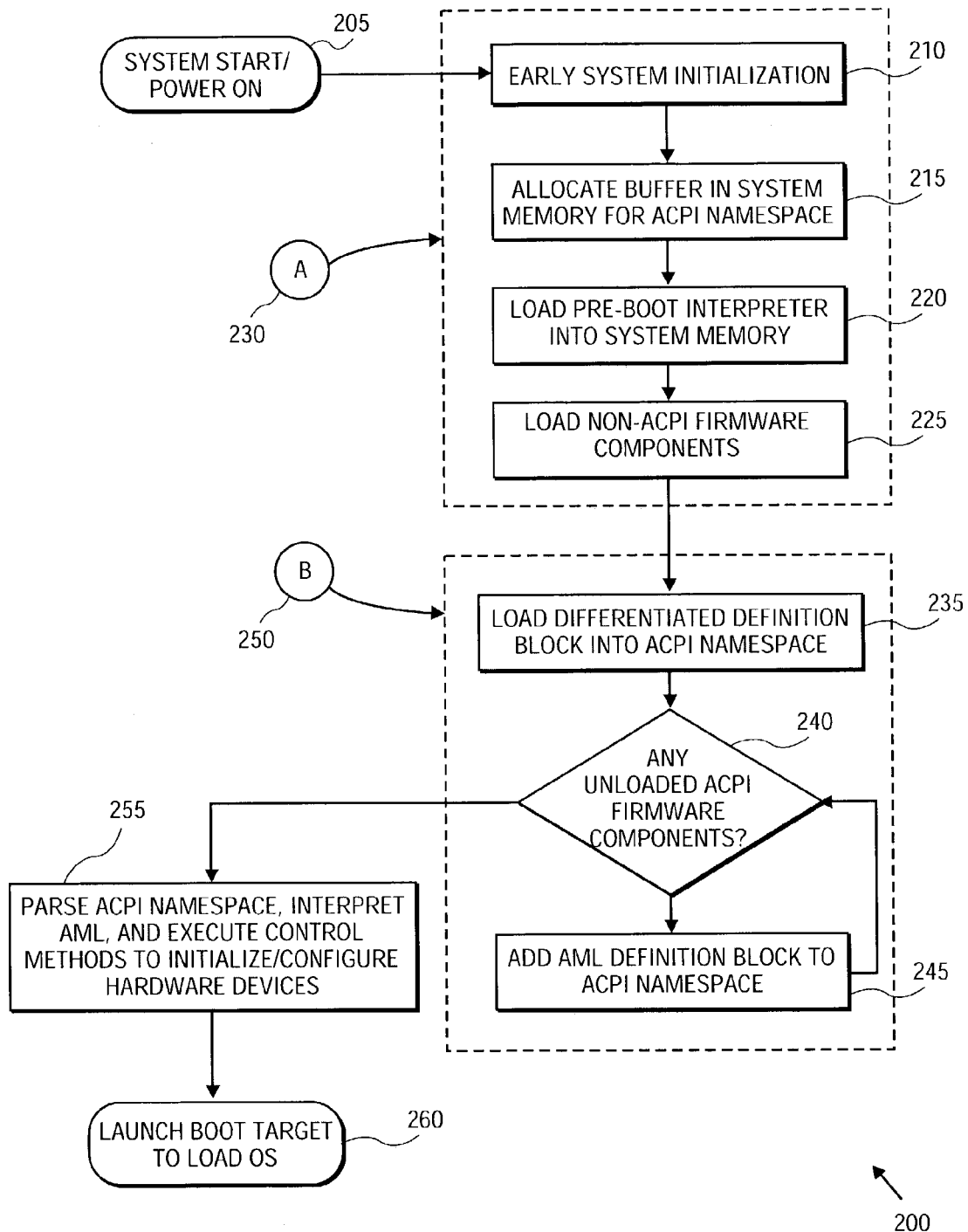
FIG. 2 is a flow diagram illustrating a method to execute interpreted language code to interact with hardware devices of a processing system during pre-boot runtime, in accordance with an embodiment of the present invention.

Turning now to FIGS. 1 and 2, an embodiment of processing system 100 operates as illustrated by a process 200 to execute interpreted language code 160 to interact with hardware devices, in accordance with the teachings of the present invention. Processing system 100 may use the following method to interact with one or more of PS/2 keyboard controller 135, serial port 140, and component X.

In a process block 205, processing system 100 is powered-on. A powered-on event may be the result of a user of processing system 100 turning processing system 100 on after being powered-off, or it may be the result of a reset of processing system 100. From process block 205, processing system 100 proceeds through early system initialization in a process block 210. This early system initialization includes processor 115 accessing firmware unit 125 to execute a pre-boot program called a basic input output system ("BIOS"), which may include a power on self test ("POST") among other tasks.

In a process block 215, processor 115 allocates a buffer in system memory 120 for an ACPI namespace 300. Reserving an empty location in system memory 120 where data objects can be stored creates this buffer.

In a process block 220, processor 115 loads pre-boot interpreter 165 stored in firmware unit 125 into system memory 120. In one embodiment, pre-boot interpreter 165 is an extensible firmware interface ("EFI") driver compliant with the EFI Specification, Version 1.10, Dec. 1, 2002, developed by Intel Corporation. In one embodiment, pre-boot interpreter 165 is single-threaded, non-reentrant firmware code. Although pre-boot interpreter 165 is illustrated as residing in firmware unit 125, other embodiments of the present invention include pre-boot interpreter 165 being stored on hard disk 110 or other nonvolatile memory units communicatively coupled to processor 115. Pre-boot interpreter 165 is a program that when called by the BIOS or other programs, interprets and executes interpreted language code 160 to effect a desired interaction with hardware devices of processing system 100, such as PS/2 keyboard controller 135, serial port 140, or component X. In the example where interpreted language code 160 is AML, pre-boot interpreter 165 is an AML interpreter.

In a process block 225, processor 115 loads non-ACPI compliant firmware components into system memory 120. In one embodiment, this may include executing one or more legacy application programming interfaces ("APIs"). Collectively, process blocks 210–225 will be referred to as blocks 230.

In a process block 235, a differentiated definition block ("DDB") 310 is loaded into, heretofore empty, ACPI namespace 300. DDB 310 contains information about hardware implementation and configuration details in the form of data and control methods encoded in AML. In one embodiment, DDB 310 is a portion of interpreted language code 160 stored in firmware unit 125.

Figure 3:
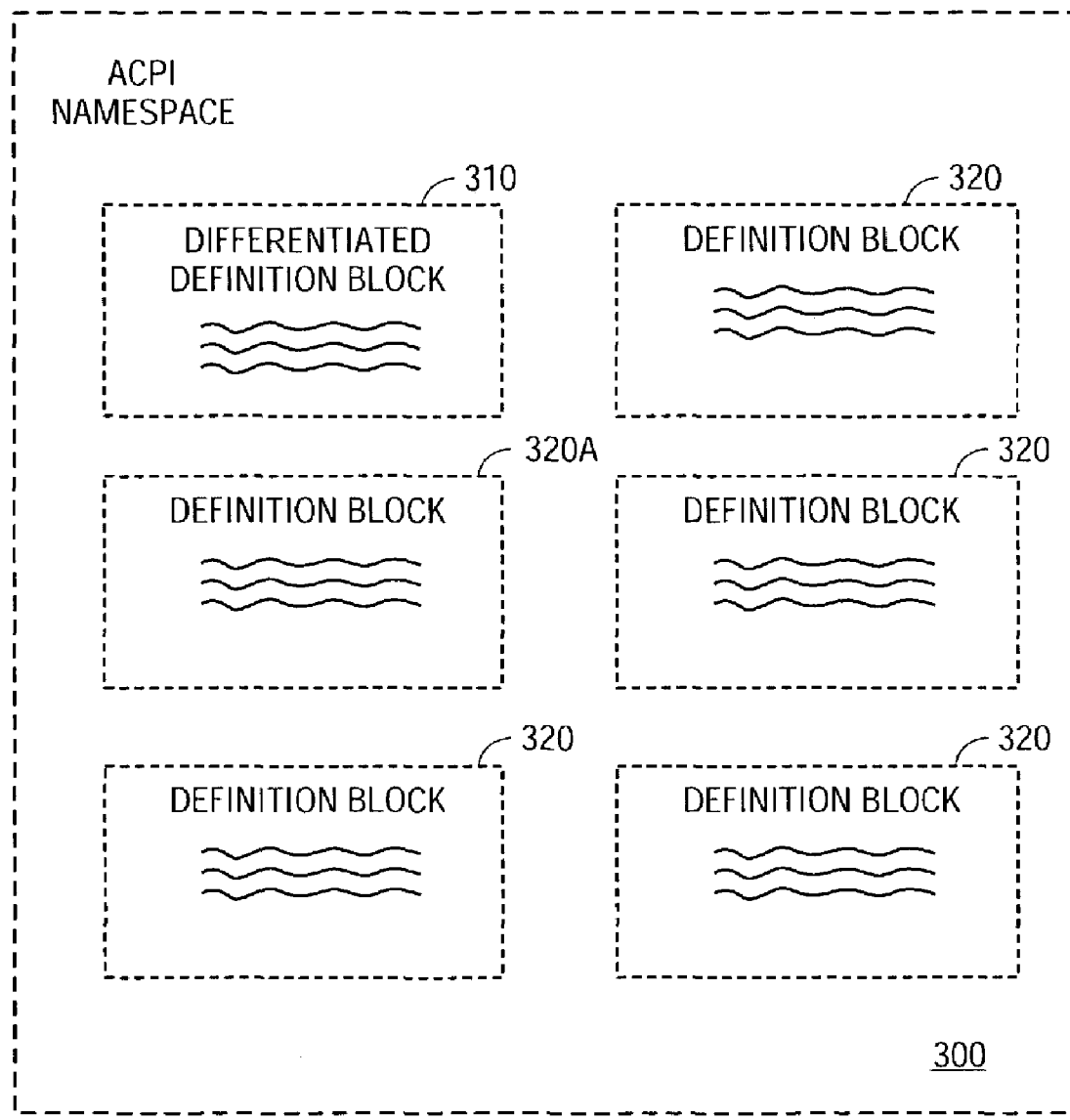
FIG. 3 is a block diagram illustrating an ACPI namespace for sharing AML control methods across the pre-boot runtime and the OS runtime, in accordance with an embodiment of the present invention.

FIG. 3 is a block diagram illustrating ACPI namespace 300 for sharing AML control methods across the pre-boot runtime and the OS runtime of processing system 100. In one embodiment, ACPI namespace 300 is a hierarchical tree structure that contains at least DDB 310.

In a decision block 240, the BIOS searches hardware devices coupled to motherboard 105 for ACPI compliant hardware devices. For example, if PS/2 keyboard controller 135 is an ACPI compliant hardware device it will have an associated definition block 320A. Definition blocks 320 contain information about hardware implementation and configuration details in the form of the AML control methods described above. An OEM of PS/2 keyboard controller 135 can provide one or more definition blocks 320, which can be dynamically inserted and removed from ACPI namespace 300. Prior to definition blocks 320 being inserted into ACPI namespace 300, they can be stored within firmware unit 125, as a portion of interpreted language code 160, or embedded within a driver image on an option ROM associated with the particular hardware device. Thus, in the case of PS/2 keyboard controller 135, definition block 320A may be stored optionally within firmware unit 125 or option ROM 137.

In a process block 245, the BIOS inserts definition block 320A corresponding to PS/2 keyboard controller 135 into ACPI namespace 300. As discussed above, definition block 320A contains one or more AML control methods for interacting (e.g., initializing, configuring, etc.) with PS/2 keyboard controller 135. Process 200 then returns to decision block 240 to determine whether other hardware devices are ACPI compliant and have definition blocks to insert into ACPI namespace 300. Decision block 240 and process block 245 may be repeated for serial port 140 and component X, if they are ACPI compliant. When it is determined in decision block 240 that no further hardware devices of processing system 100 have definition blocks to insert into ACPI namespace 300, process 200 continues to a process block 255.

Process block 235, decision block 240, and process block 245 collectively will be referred to as blocks 250. In one embodiment, blocks 250 illustrate how DDB 310 and definition blocks 320 can be dynamically inserted into ACPI namespace 300. In an alternative embodiment, a memory image of ACPI namespace 300, including DDB 310 and all definition blocks 320, is stored as interpreted language code 160. In this alternative embodiment, blocks 250 would be replaced with a single act of loading this memory image of ACPI namespace 300 into the buffer allocated in system memory 120 in process block 215 above.

In process block 255, pre-boot interpreter 165 is called by the BIOS to parse ACPI namespace 300, interpret the AML control methods associated with DDB 310 and the various definition blocks 320, and execute the desired interactions with hardware devices of processing system 100. Exemplary interactions with hardware devices of processing system 100 include initialization or configuration of hardware data and status registers. In the example of PS/2 keyboard controller 135, the BIOS may call pre-boot interpreter 165 to execute one or more AML control methods of definition block 320A to initialize PS/2 keyboard controller 135.

It should be appreciated that the order of many of the process blocks in process 200 can be changed within the scope of the present invention. For instance, the order of the process blocks 215, 220, and 225 may be reordered in any desirable manner. Furthermore, process blocks 220 and 225 may be executed between process blocks 245 and 255, after ACPI namespace 300 is setup.

Once all initializations and/or configurations of hardware devices are complete, in a process block 260, the BIOS launches the boot target, which takes control of processing system 100 and begins to load OS files 150 (e.g., IO.SYS in the case of a Microsoft Windows™ OS) from hard disk 110. Once the OS files 150 begin to load into system memory 120, the pre-boot runtime terminates and the OS runtime begins.

Once processing system 100 is executing in OS runtime, processor 115 can load and execute OS interpreter 155 stored on hard disk 110. Thus, in one embodiment, OS interpreter 155 is an OS driver/application. In one embodiment, OS interpreter 155 will parse and interpret the same ACPI namespace 300 during the OS runtime so that the OS can interact with hardware devices of processing system 100 (e.g., PS/2 keyboard controller 135, serial port 140, component X, etc.). Thus, in this embodiment, both pre-boot interpreter 165 and OS interpreter 155 share the same ACPI namespace 300 across the pre-boot runtime and the OS runtime of processing system 100. Sharing ACPI namespace 300 across the pre-boot runtime and the OS runtime eliminates the need for redundant BIOS APIs. This frees up valuable memory in firmware unit 125 for other firmware code.

Figure 4:
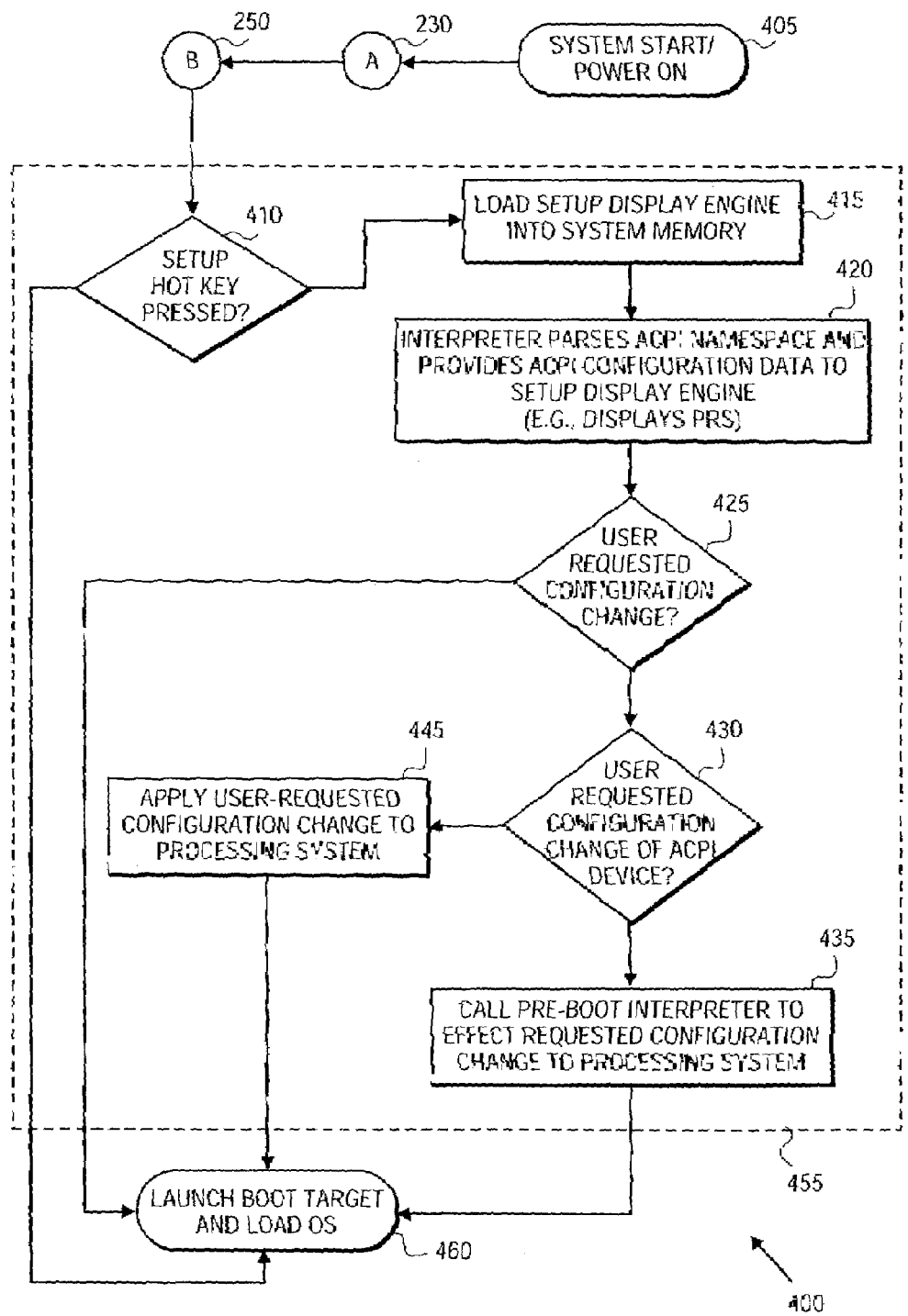
FIG. 4 is a flow diagram illustrating a method to execute interpreted language code for configuring hardware devices during a pre-boot runtime, in accordance with an embodiment of the present invention.

Turning now to FIG. 4, an embodiment of processing system 100 operates as illustrated by a process 400 to execute interpreted language code 160 for configuring hardware devices during the pre-boot runtime, in accordance with an embodiment of the present invention.

In a process block 405, processing system 100 is powered-on. Process block 405 is similar to process block 205 described above. Process 400 proceeds through blocks 230 and 250 as described above to setup and load ACPI namespace 300 with DDB 310 and definition blocks 320.

Next, process 400 executes the process blocks and decision blocks encompassed within a block 455. Block 455 corresponds to one embodiment of process block 255, discussed above, for configuring hardware devices of processing system 100 (e.g., PS/2 keyboard controller 135, serial port 140, component X, etc.).

In a decision block 410, the BIOS determines whether a "hot key" (e.g., F2) was pressed by a user of processing system 100 during the pre-boot runtime. In one embodiment, pressing the hot key indicates to the BIOS to load and execute a setup display engine 170. In one embodiment, the setup display engine provides a graphical user interface for the user to make user-selectable changes and/or view configuration settings of processing system 100. If the hot key is pressed during the pre-boot runtime, the BIOS loads and executes setup display engine 170 in a process block 415. If the hot key is not pressed during the pre-boot runtime, process 400 proceeds to a process block 460, wherein the boot target is launched and OS files 150 are loaded into system memory 120.

In a process block 420, pre-boot interpreter 165 parses and interprets ACPI namespace 300 to determine current resource settings ("CRS") and possible resource settings ("PRS") of processing system 100. The CRS and PRS are described by data and control methods encoded in interpreted language code 160 and enumerated in ACPI namespace 300. The CRS describe current configuration settings of processing system 100 and the PRS describe possible configuration settings of processing system 100.

Figure 5:
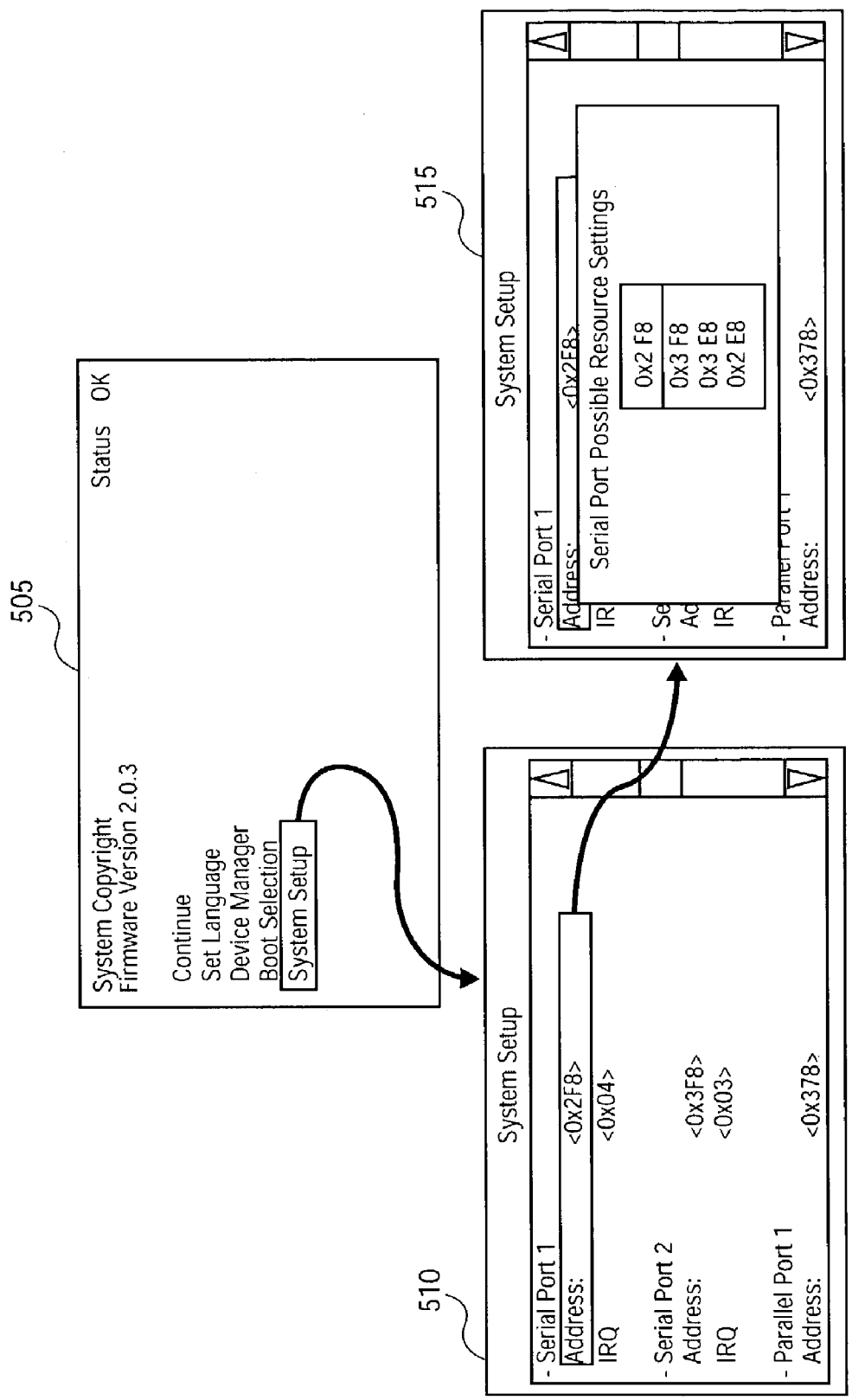
FIG. 5 is an exemplary setup display for configuring hardware devices using an interpreted language code during the pre-boot runtime, in accordance with an embodiment of the present invention.

Thus, pre-boot interpreter 165 passes the interpreted AML data to setup display engine 170, which displays the CRS and PRS on a display terminal in a user-friendly format. FIG. 5 illustrates three exemplary user-friendly displays that one embodiment of setup display engine 170 may provide. A display 505 may be the first image the user is shown after pressing the hot key during the pre-boot runtime. By moving a cursor on the screen to highlight "system setup" and pressing "enter", setup display engine 170 generates a display 510. Display 510 illustrates the CRS. For example, "serial port 1" is currently assigned to address "0x2F8." By highlighting the "address" with the cursor and pressing "enter", setup display engine 170 generates a display 515. Display 515 illustrates the PRS for the serial port 1. Again, the user can effect a configuration change merely by moving the cursor over the desired resource setting and pressing "enter". Upon pressing "enter", setup display engine 170 calls pre-boot interpreter 165 to execute the appropriate AML control methods necessary to effect the configuration change to serial port 140.

Returning to FIG. 4, in a process block 425, setup display engine 170 determines whether a configuration change was requested by the user, such as described above. If a configuration change was requested, process 400 continues to a decision block 430. If a configuration change was not requested, process 400 proceeds to process block 460, described above.

In decision block 430, if the user requested a configuration change to an ACPI compliant hardware device, then process 400 continues to a process block 435 where setup display engine 170 calls pre-boot interpreter 165 to execute the requisite AML control methods to effect the changes in hardware. After effecting the requested change, the boot target is launched in process block 460.

On the other hand, if the user requested a configuration change to a non-ACPI compliant hardware device in decision block 430, process 400 proceeds to a process block 445. In process block 445, the BIOS executes the requisite legacy APIs to effect the changes in hardware. Once the APIs complete their task, the boot target is launched in process block 460.

Figure 6:
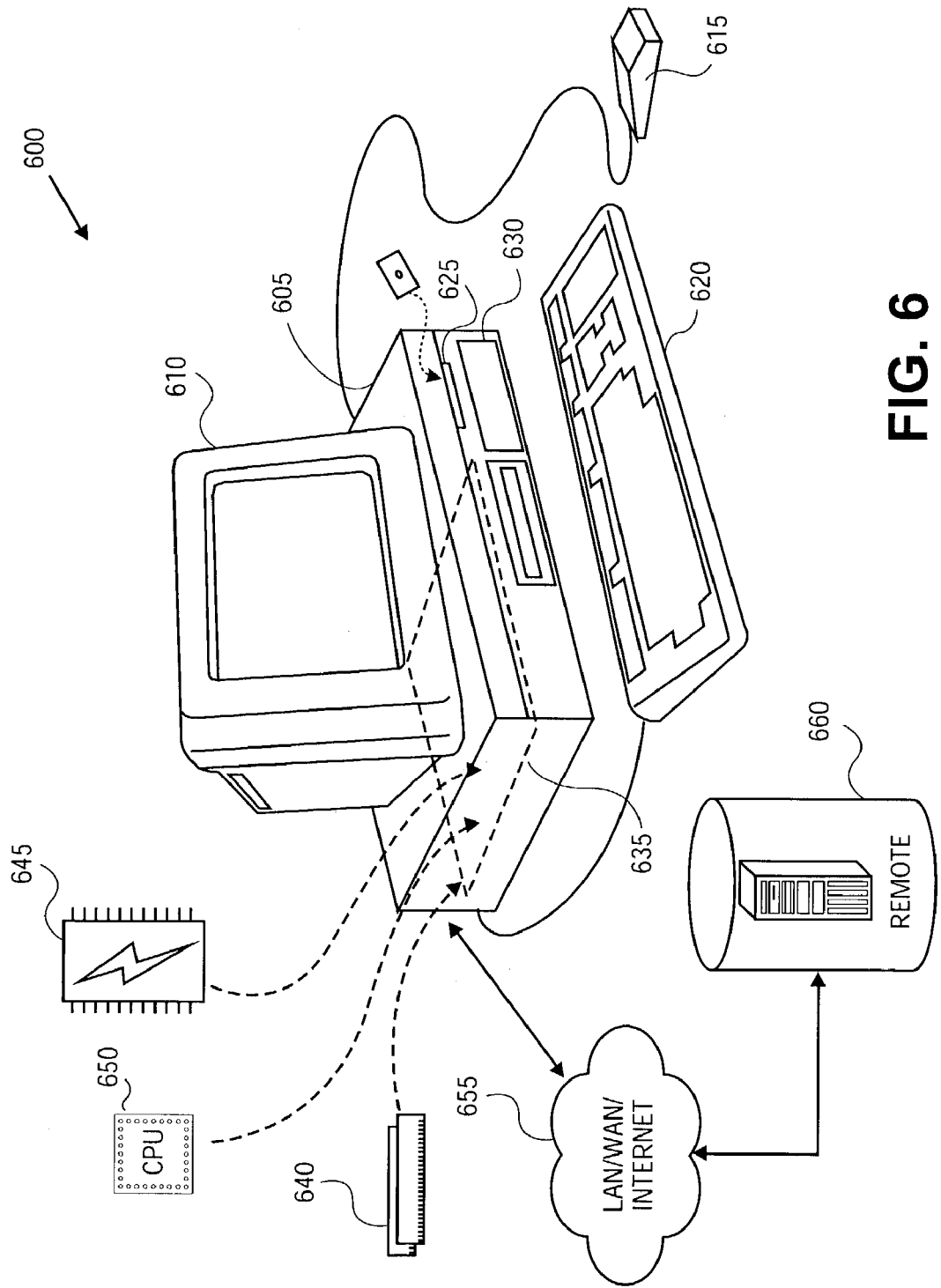
FIG. 6 illustrates an exemplary computer system to execute interpreted language code to interact with hardware devices of the computer system during a pre-boot runtime, in accordance with an embodiment of the present invention.

FIG. 6 illustrates one embodiment of a computer system 600 to execute interpreted language code 160 to interact with hardware devices during the pre-boot runtime, in accordance with an embodiment of the present invention. Computer system 600 includes a chassis 605, a monitor 610, a mouse 615 (or other pointing device), and a keyboard 620. The illustrated embodiment of chassis 605 further includes a floppy disk drive 625, a hard disk 630, a power supply (not shown), and a motherboard 635 populated with appropriate integrated circuits including system memory 640, firmware unit 645, and one or more processors 650.

In one embodiment, a network interface card ("NIC") (not shown) is coupled to an expansion slot (not shown) of motherboard 635. The NIC is for connecting computer system 600 to a network 655, such as a local area network, wide area network, or the Internet. In one embodiment network 655 is further coupled to a remote computer 660, such that computer system 600 and remote computer 660 can communicate.

Hard disk 630 may comprise a single unit, or multiple units, and may optionally reside outside of computer system 600. Monitor 610 is included for displaying graphics and text generated by software and firmware programs run by computer system 600. Mouse 615 (or other pointing device) may be connected to a serial port (e.g., serial port 140 described above), USB port, or other like bus port communicatively coupled to processor(s) 650. Keyboard 620 is communicatively coupled to motherboard 635 via a keyboard controller (e.g., PS/2 keyboard controller 135 described above) or other manner similar as mouse 615 for user entry of text and commands.

In one embodiment, firmware unit 645 may store interpreted language code 160, pre-boot interpreter 165, and setup display engine 170 described above. In one embodiment, hard disk 630 may store OS files 150 and OS interpreter 155 described above. Similarly, system memory 640 may temporarily store ACPI namespace 300 while computer system 600 is in use.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   providing an interpreted language code to a processing system, the interpreted language code defining how to interact with a hardware device of the processing system; and
   interpreting the interpreted language code to interact with the hardware device of the processing system prior to entering an operating system ("OS") runtime mode of operation of the processing system.

2. The method of claim 1 wherein the OS runtime mode of operation is entered no earlier than the beginning of loading an OS into system memory of the processing system.

3. The method of claim 2, further comprising interpreting the interpreted language code to interact with the hardware device after entering the OS runtime mode of operation.

4. The method of claim 1 wherein the interpreted language code is compliant with an advance configuration and power interface ("ACPI") specification.

5. The method of claim 4 wherein the interpreted language code comprises ACPI machine language("AML").

6. The method of claim 1, further comprising interpreting the interpreted language code prior to entering the OS runtime mode of operating to interact with a plurality of other hardware devices.

7. The method of claim 1 wherein interacting with the hardware device includes configuring the hardware device to reflect user-selectable changes.

8. A method, comprising:
providing an interpreted language code defining how to interact with one or more hardware devices of a processing system;
interpreting the interpreted language code during a pre-boot runtime of the processing system; and
interacting with at least one hardware device of the processing system based on the interpretation of the interpreted language code.

9. The method of claim 8 wherein the interpreted language code is compliant with an advance configuration and power interface ("ACPI") specification.

10. The method of claim 9 wherein the interpreted language code comprises ACPI machine language ("AML").

11. The method of claim 8, further comprising:
interpreting the same interpreted language code during an operating system ("OS") runtime of the processing system; and
interacting with at least one hardware device of the processing system based on the interpretation of the interpreted language code.

12. The method of claim 11 wherein the interpretation of the interpreted language code during the pre-boot is executed by a firmware driver.

13. The method of claim 11 wherein the interpretation of the interpreted language code during the OS runtime is executed by an OS driver.

14. An article of manufacture comprising a computer-accessible medium having stored thereon instructions that, when executed by a processor, cause the processor to:
interpret a first portion of an interpreted language code defining how to interact with a hardware device of a processing system; and
interact with the hardware device of the processing system based on the interpretation of the first portion of the interpreted language code prior to entering an operating system ("OS") runtime mode of operation of the processing system.

15. The computer-accessible medium of claim 14 wherein the interpreted language code is compliant with an advance configuration and power interface ("ACPI") specification.

16. The computer-accessible medium of claim 15 wherein the interpreted language code comprises an ACPI machine language.

17. The computer-accessible medium of claim 14 wherein the interpreted language code includes a plurality of other portions defining how to interact with a corresponding plurality of other hardware devices of the processing system, the computer-accessible medium having further instructions stored thereon that cause the processor to interact with the plurality of other hardware devices based on the corresponding interpretations of the plurality of other portions of the interpreted language code.

18. A processing system, comprising:
a processor;
a hardware device communicatively coupled to the processor; and
flash memory communicatively coupled to the processor, the flash memory having stored therein an interpreted language code defining how to interact with the hardware device, the processor to execute the interpreted language code via an interpreter to interact with the hardware device prior to executing operating system ("OS") files.

19. The processing system of claim 18 wherein the hardware device includes a component of a motherboard of the processing system.

20. The processing system of claim 19 wherein the component of the motherboard includes a serial port.

21. The processing system of claim 19 wherein the component of the motherboard includes a PS/2 keyboard controller.

22. The processing system of claim 18 wherein the interpreter is stored in the flash memory unit.

23. The processing system of claim 18 wherein the interpreter comprises an extensible firmware interface driver.

24. The processing system of claim 18 wherein the processor executes an OS driver to interpret the interpreted language code to interact with the hardware device during an OS runtime of the processing system.

25. The processing system of claim 18 wherein the interpreted language code includes advance configuration and power interface machine language ("AML").

26. The processing system of claim 18 wherein the interpreted language code further defines how to interact with a plurality of other hardware devices of the processing system.

* * * * *